United States Patent [19]
Stella

[11] 4,084,171
[45] Apr. 11, 1978

[54] PHOTOGRAPHIC CASSETTE HAVING PRESSURE PLATE RELEASE OF A PROCESSOR DISABLING VALVE

[75] Inventor: Joseph A. Stella, Peabody, Mass.

[73] Assignee: Polaroid Corporation, Cambridge, Mass.

[21] Appl. No.: 729,390

[22] Filed: Oct. 4, 1976

[51] Int. Cl.² .............................................. G03D 5/06
[52] U.S. Cl. .................................... 354/317; 354/88; 352/78 R; 352/130
[58] Field of Search ............... 352/78 R, 130; 354/88, 354/317

[56] References Cited
U.S. PATENT DOCUMENTS

| | | | |
|---|---|---|---|
| 3,748,994 | 7/1973 | Stella | 352/130 |
| 3,785,725 | 1/1974 | Batter et al. | 352/130 |
| 4,003,064 | 1/1977 | Mason | 354/317 |

Primary Examiner—L. T. Hix
Assistant Examiner—Alan Mathews
Attorney, Agent, or Firm—Frederick A. Goettel, Jr.

[57] ABSTRACT

Apparatus is provided for positively retaining a slidably displaceable valve member in its stored position prior to initiation of the processing cycle in a multi-purpose film cassette of the type containing a photographic film strip for exposure, processing and viewing without removal from the cassette. A latching arm forming a part of the valve member is configured to prevent displacement of the valve member at all times prior to the movement of the pressure plate to the position it occupies during high speed continuous advancement of the film. Movement of the pressure plate to this position results in release of the latching arm and accordingly permits displacement of the valve member to its final position where it serves to seal off the processing fluid nozzle.

8 Claims, 7 Drawing Figures

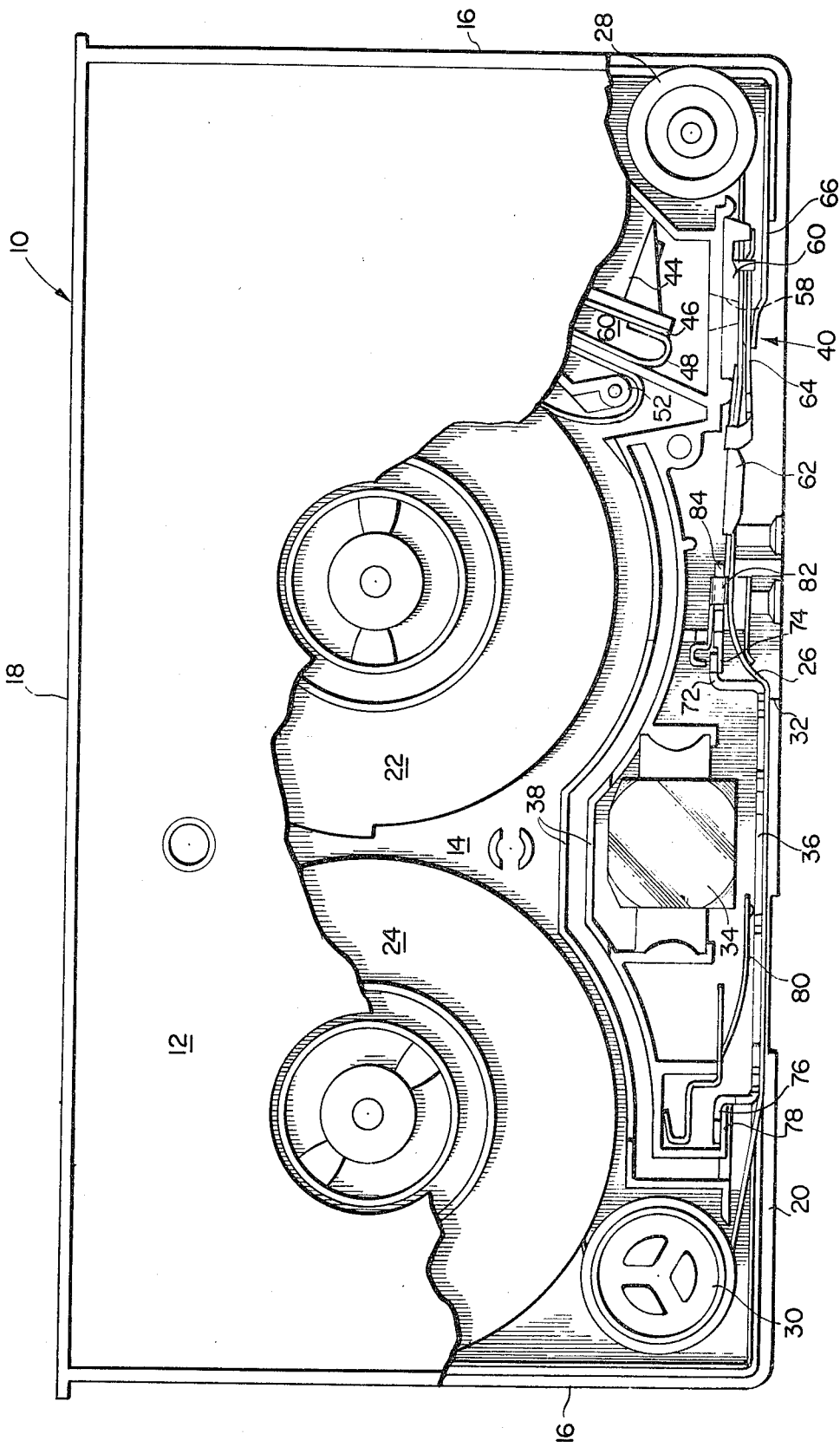

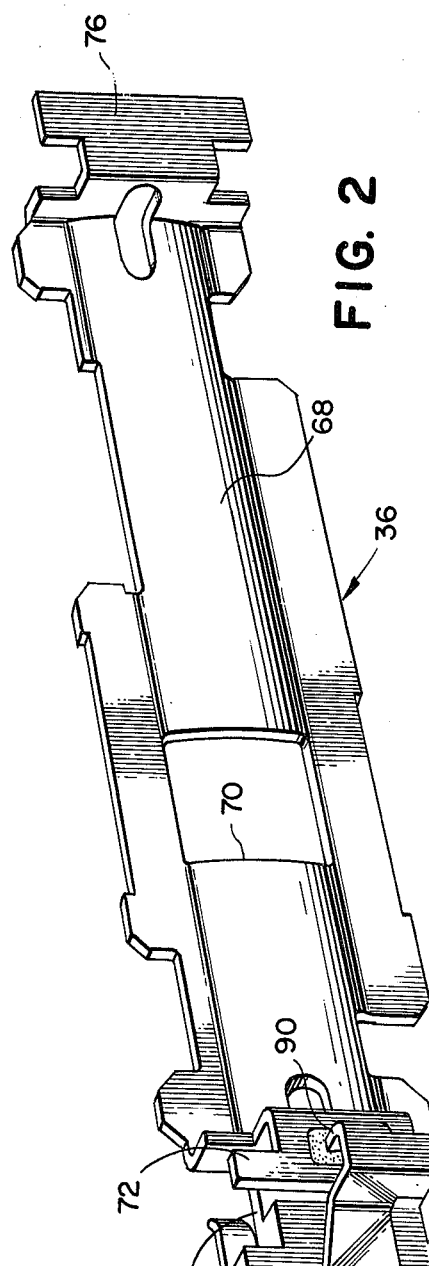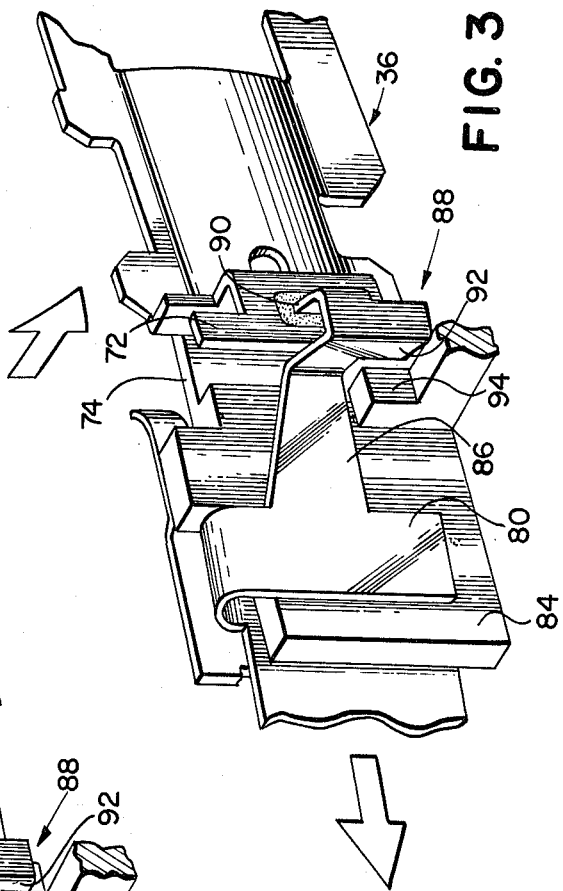

PHOTOGRAPHIC CASSETTE HAVING PRESSURE PLATE RELEASE OF A PROCESSOR DISABLING VALVE

BACKGROUND OF THE INVENTION

This invention relates to film processing apparatus and, more particularly, an improved multi-purpose film handling cassette for exposing, processing and projecting images of photographic film.

Multi-purpose photographic cassettes have been developed for use in motion picture photographic systems capable of processing an exposed strip of photographic material to a viewable condition as illustrated and described in such prior references as U.S. Pat. No. 3,615,127 issued to Edwin H. Land on Oct. 26, 1971; U.S. Pat. No. 3,623,417 issued Nov. 30, 1971 to Vaito K. Eloranta; and U.S. Pat. No. 3,748,994 issued July 31, 1973 to Joseph A. Stella, all of which are owned by the assignee of the present invention.

In such systems, use is made of a film handling cassette within which the several operations of exposure, chemical processing, drying and projection of the recorded images are accomplished without transferring the film from the cassette. In this arrangement, the strip of photographic film contained in the cassette can be exposed in a camera adapted to receive the cassette and then processed to provide viewable images by placing the cassette in a viewing apparatus equipped to activate the cassette-contained processor upon rewinding the exposed film strip. After processing in this manner, the viewing apparatus is operated as a projector to advance the film incrementally frame by frame past a light source for viewing of the recorded images.

In this arrangement, the unexposed photosensitive strip, initially wound upon a supply reel, preferably passes from the supply reel through a normally inoperative processing station and then across an opening of the cassette which functions at different intervals as both an exposure and projection station. Beyond the exposure station, the film is wound onto the takeup reel.

When substantially the entire length of the photosensitive strip in the cassette has been exposed and wound onto the takeup reel, the cassette is then loaded into a special purpose projector in which the motion of the film is reversed, this time passing from the takeup reel onto the supply reel. In its movement in this reverse direction, the film strip actuates the normally inoperable processing station so that the film strip is subjected to processing treatment in which a thin layer of processing fluid is supplied to the portion of the film emulsion intermediate the film margins by means such as, for example, a doctor blade in communication with and supplied with processing fluid passing through a nozzle communicating with a processing fluid reservoir. Immediately following the fluid deposition, in response to further film advancement a valve member is actuated to move into blocking engagement with the processing fluid nozzle accordingly terminating further passage of processing fluid from the reservoir. The film bearing the still wet layer of processing fluid is then again advanced through the exposure-processing station for projection and to complete drying of the film.

It can be appreciated that following the deposition of the processing fluid layer upon the film and prior to advancement of the still wet film strip through the exposure-processing station for the initial projection and drying operations that it is critical that the flow of processing fluid through the nozzle be completely and positively terminated immediately following deposition of the processing fluid upon the film strip. As briefly set forth above, in prior designs, incorporated in the processor is a slideable nozzle valve which is utilized to close off the processor nozzle and thereby disable the processor immediately following treatment of the film strip with the processing fluid. In relation to the nozzle opening, the valve is positioned initially in front of the nozzle opening in terms of film strip travel during rewind. Additionally, a pressure pad component is positioned beneath the nozzle opening and slightly rearwardly of this opening in terms of film strip travel during rewind. In these initial positions, neither the valve nor the pressure pad restricts free travel of the film strip during the exposure operation in which the film travels in a direction opposite to that during rewind. The viewing apparatus in which the film strip is processed is programmed so that just prior to release of the processing fluid the film strip is advanced through a final travel from the supply spool to the takeup reel. During this final travel a discontinuity or the like on the film strip located at the supply spool or trailing end of the film strip engages the pressure pad to a position such that a film engaging surface on the pressure pad is brought under and into juxtaposition with the nozzle opening to thereby retain and interpose incremental portions of the film strip firmly aganst the under surface of the fluid applicator housing.

Following the processing operation and also as a result of another film discontinuity or the like, located at the leading or takeup end of the film strip, the valve member is moved from its initial position so that it underlies and blocks the nozzle opening. Further, during this displacement of the valve, the pressure pad is jammed downwardly away from the film strip by side cams of the valve so as to deactivate the pressure pad and to free the film strip for unrestricted travel in either direction for subsequent projection and rewind cycles.

Accordingly, the valve member which is adapted to slide readily from its initial position to its processor disabling position serves not only to shut off the flow of processing fluid from the processor, but also serves the important function of displacing the pressure pad which performs a critical function in spreading the desired processing fluid layer upon the film strip during the processing operation into a position where it will not interfere with the film strip travel once the processing has been accomplished. Accordingly, it will be appreciated that it is extremely important that the slide valve be accurately located and that premature release of the valve not occur prior to the time it is caused to move from its initial position into sealing engagement with the processing fluid nozzle. In order to retain the slide valve in its initial open position, a frictionally engaging spring member or the like has been used. However, such a means has been found inadequate to retain the valve in its initial position during rough handling, for example, should the cassette be dropped prior to exposure and processing of the film strip.

SUMMARY OF THE INVENTION

In accordance with the present invention, means are provided to retain the slide valve in its initial stored position as long as the pressure plate remains in the position it occupies when the cassette is not operatively engaged by the viewer/processor to move the pressure plate to a different position.

In the preferred embodiment, the movement which the pressure plate undergoes when the viewer/processor is operated to transport the film strip in the continuous high-speed mode is used to release the slide valve to render it free to be operated by the moving film strip. When the viewer/processor is preparing for such a mode of operation, lifting pins or the like in the viewer/processor operate to lift the pressure plate out of engagement with the film strip so that the film may be moved past the exposure/projection station with minimal resistance or drag.

Under normal operating conditions, the first time in the life span of a cassette that such displacement of the pressure plate occurs is when an exposed, unprocessed cassette is placed into the viewer/processor. It is immediately following the processing cycle that the slide valve is moved to close off the nozzle, and accordingly, making use of the pressure plate displacement, upon initiation of the processing cycle, to release the valve assures prevention of premature release of the valve up until this time.

One arrangement, a "passive" system, relies upon the pressure plate in its normal, at rest position where it is biased against cassette structure to positively hold a deflected resilient latching arm associated with the slide valve into engagement with suitable restraining cassette structure. Movement of the pressure plate by the lifting pins or the like results in movement of the deflected resilient latching arm to its undeflected position wherein it is no longer in restraining engagement with the cassette structure and accordingly the valve is free to move into blocking engagement with the nozzle valve.

Another "passive" system relies upon a latching extension from the slide valve actually positively engaging the pressure plate itself, such engagement being defeated when the pressure plate is moved to its high speed operation position.

BRIEF DESCRIPTION OF THE DRAWINGS

The novel features that are considered characteristic of the invention are set forth with particularity in the appended claims. The invention itself, however, both as to its organization and its method of operation together with additional objects and advantages thereof, will best be understood from the following description of the preferred embodiments when read in connection with the accompanying drawings wherein like numbers have been applied in the different figures to denote the same parts and wherein:

FIG. 1 is a diagrammatic view, in elevation, partially cut away to show the interior of a compact multipurpose film handling cassette embodying features of this invention;

FIG. 2 is a perspective view of a portion of a cassette illustrating the relative position of the pressure plate and slide valve in one embodiment of the invention when the cassette is not in operable engagement with other apparatus;

FIG. 3 is a view similar to FIG. 1 illustrating the relative positions of the pressure plate and slide valve following movement of the pressure plate to the position it occupies during the film processing cycle;

DESCRIPTION OF THE PREFERRED EMBODIMENT

Figure 4:
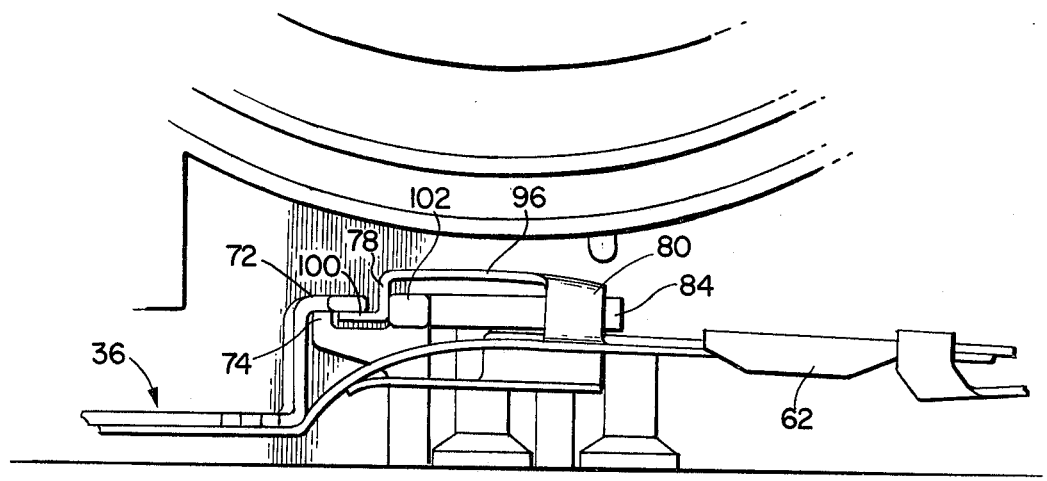
FIG. 4 is a view in elevation of a portion of a cassette illustrating the relative positions of the pressure plate and slide valve in another embodiment of the invention when the cassette is not in operable engagement with other apparatus.

The multipurpose film cassette with which the present invention is particularly adapted for use is illustrated in FIG. 1 to include an outer housing 10 in the shape of a rectangular parallelepiped having front and back walls 12 and 14 respectively, end walls 16, a top wall 18 and a bottom wall 20. Mounted for rotation between the front and back walls are supply and takeup reels 22 and 24 to which supply and takeup leader ends of a film strip 26 are affixed by appropriate means. In passing from the supply reel 22 to the takeup reel 24, the film strip 26 is trained through a series of generally straight runs defined in part by an idler roller and a snubber roller 28 and 30 respectively, and a second idler roller disposed generally in the upper right hand corner of the cassette, not shown in the drawings. As shown, the film strip 26 is traned over an opening 32 in the bottom wall 20 both for exposure in an appropriate camera (not shown) and also for projection in a viewer or projector (also not shown) by illumination passed through a reflecting prism lens 34 mounted in the cassette behind the opening 26 and the film strip run passing thereover. Situated behind the prism 34 are air vent openings (not shown) in the rear walls 14 to permit the circulation of air over the prism 34 for cooling and also for drying after film strip processing in the manner to be described below. A pressure plate 36, later described in detail, is mounted behind the film strip 26 to support the latter. The air vents, the pressure plate and the prism 34 are isolated from the supply and takeup spools 22 and 24 by a labyrinth type light seal formed in part by internal ribs 38.

Also contained in the cassette housing 10 is a processor generally designated by the reference numeral 40 which is operative after exposure of the film strip 26 to deposit a layer of processing fluid onto the emulsion side of the film strip over the entire length thereof. The processor includes a reservoir 44 in which the processing fluid is initially sealed by a tear tab closure 46 secured over a planar opening in the reservoir. In the cassette shown in FIG. 1, the fluid chamber 44 is defined by a separate part adapted to be received in the processor, the part being loaded with the processing fluid and having affixed thereto the tear tab closure 46.

To enable release of the processing fluid from the initially sealed chamber 44 after exposure of the film strip 26, a pull strip 48 having one end 50 releasably secured to the tear tab closure 46 is trained about a pair of guide rollers only one of which, 52, is shown in the drawings so that a free end (not shown) of the pull strip may be engaged to an aperture (not shown) in the supply end of the film strip 26 upon initial rewind movement thereof. The operation of the pull strip 48 is described fully in U.S. Pat. No. 3,895,862 of Joseph A. Stella et al. which is assigned to the assignee of the present invention. Briefly, the free end portion of the pull strip 48 rides against the outermost convolution of the film strip contained on the supply spool 22 as the film strip is paid from the supply spool to the takeup spool 24 during exposure of the film strip. Reversal of the film strip direction of movement during rewind, however, effects an attachment of the pull strip to the supply end leader of the film strip so that the pull strip will be wound with the film on the supply spool. As a consequence, the tear tab closure 46 will be drawn away from the reservoir opening to release the processing fluid to a second chamber 54 in the processor.

The chamber 54 is located over an opening 58 in a processing fluid applicator nozzle 60 and the released processing fluid passes into the chamber and through the nozzle opening for application to the emulsion side of the film strip. Incorporated in the processor 40 is a nozzle valve 62 which as later explained in detail with respect to the operation of the cassette is utilized to close off the processor nozzle 52 and thereby disable the processor following treatment of the film strip 26 with the processing fluid. In relation to the nozzle opening 58, the valve 62 is positioned initially to the left as shown in FIG. 1 or in front of the nozzle opening in terms of film strip travel during rewind. Additionally, a pressure pad 64 supported by a leaf spring 66 retains the film strip in operative relation to the nozzle 60 during the film strip processing It is to be noted that the multi-purpose cassette and components thereof described in the preceding paragraphs represent a cassette structure which in itself is not novel with the present invention. It is important to a full understanding of the present invention, however, that the characteristics and operation of the cassette illustrated in FIG. 1 be understood. Specifically, following exposure of the film strip by incremental advance thereof past the opening 32 in a direction proceeding from the supply spool 22 to the takeup spool 24, a processing operation is initiated by driving the supply spool at constant angular velocity to rewind the film strip from the takeup spool 24 back onto the supply spool 22. This procedure is effected by removing the cassette from the camera in which it is exposed and placing it in a processor/viewer device (not shown) equipped with appropriate means for driving the supply spool 22 to rewind the film strip 26 in the manner described. During such rewinding movement, the emulsion side of the film strip will be drawn past the nozzle 60 to receive a layer of processing fluid now released from the reservoir 44 as a result of the tear tab closure 46 having been removed in the manner described above.

Immediately following the processing operation and as a result of a film discontinuity or the like, for example a neck down portion located at the leading or takeup end of the film strip, the valve 70 is caused to move to the right from the position illustrated in FIG. 1 so that it underlies and blocks the nozzle opening 58. Further, during this displacement of the valve 62, the pressure pad 64 is cammed downwardly away from the film strip 26 by side cams 68 of the valve so as to deactivate the pressure pad and to free the film strip 26 for unrestricted travel in either direction for subsequent projection and rewind cycles.

As previously indicated, a pressure plate 36 is mounted in the cassette housing 10 behind the cassette opening 32 to support the segment of the film strip 26 passing thereby in a predetermined focal plane which will be discussed in more detail hereinbelow. Referring to FIGS. 1 and 2, the pressure plate 36 comprises a plate member 68 having a substantially centrally located aperture 70. The plate member 68 terminates at each end in a pressure plate mounting section offset from and parallel to the plane of the pressure plate opening 70. The pressure plate mounting section on the right hand end of the pressure plate, i.e., the end adjacent the nozzle valve 62 is adapted to bear against a mating portion of the cassette internal structure 74 to retain the pressure plate in the position shown in FIG. 1. The pressure plate retaining section 76 at the opposite end of the pressure plate is similarly retained in the position shown in FIG. 1 by a corresponding mating structural section 78 in the interior of the cassette. The pressure plate is held positively in the position shown in FIG. 1 by a leaf spring structure 80 which biases the pressure plate outwardly through a force applied to the plate just to the left of the opening 70 in the pressure plate. The position of the pressure plate in FIGS. 1 and 2 is that which the pressure plate occupies when the cassette is not operatively engaged with either camera or processing/viewing apparatus.

Again with reference to FIGS. 1 and 2, it will be seen that the displaceable nozzle valve 62 comprises an inverted U-shaped sheet metal section 82 which is adapted to slideably engage a structural portion 84 of the interior of the cassette. Extending from the back side of the U-shaped portion of the nozzle valve is a deflectable arm 86 which terminates in a hook-like latching section 88 having an outermost leg 90 which is in confronting relation with the back side of the retaining section 72 of the pressure plate 36. The hook portion 88 of the deflectable arm 86 also presents a flat surface 92 facing away from the pressure plate and extending in a direction substantially normal to the direction of travel of the nozzle valve 62 when it is moved into sealing engagement with the processor nozzle 60. This surface 92 as is clearly seen in FIG. 2, is in confronting relation with an upstanding protuberance 94 forming a part of the internal cassette structure. Accordingly, with the pressure plate and slide valve in the position illustrated in FIGS. 1 and 2, the slide valve 62 is positively restrained from movement towards the processor nozzle. This arrangement precludes premature movement of the nozzle valve towards the nozzle area during handling of the cassette prior to the termination of processing and actuation of the valve as will be explained below. Premature release of the valve could result in complete failure of, or at the least, some adverse affect upon the film processing. For example, if the valve were to move into its position between the nozzle and the pressure pad prior to processing, the critical relationship between the pressure pad and the nozzle which results in a precise thickness of processing fluid being deposited on the film emulsion could be adversely affected resulting in imperfect development of the images on the film strip.

As best seen in FIG. 2, the surface 92 which engages the protuberance 94 of the film cassette extends downwardly below the lowermost level of the deflectable arm 86 and deflection of the deflectable arm 86 towards the interior of the cassette will cause the engaging surface 92 to move out of confronting relationship with the protuberance 94 and would permit movement of the slide valve to the right (to the left in FIG. 2) towards its position in sealing engagement with the nozzle 60. Such deflection of the deflectable arm is achieved by movement of the pressure plate from the position illustrated in FIGS. 1 and 2 to a position nearer the outermost surface of the prism 34. Movement of the pressure plate 36 and the resultant deflection of the arm 86 to a position where the surface 92 is free of interference with the protuberance 94 occurs when a cassette containing exposed, but unprocessed film is placed in apparatus which is designed to cause the cassette to undergo its processing mode of operation. In the preferred embodiment, the displacement of the pressure plate 36 which occurs at the initiation of the processing cycle is caused to occur by lifting pins in the processor/viewer which are actuated to move the pressure plate to its displaced position any time that the film strip is to be transported in a continuous high-speed manner.

Accordingly, the slide valve is positively retained in its initial stored position within the cassette up until the time when it is in operative engagement with the apparatus which will drive the cassette to carry out the processing operation; only then, is the slide valve free to be moved in response to movement of the film strip to the desired position where it serves to seal the nozzle opening 58 and to hold the pressure pad 64 away from the nozzle surface to permit drag-free passage of the film past the processor region for subsequent viewings of the film strip.

Referring to FIGS. 2 and 3, there is provided on the surface of the pressure plate retaining section 72 and area of insulation material 110 to prevent an electric current path from being established between the pressure plate and the slide valve 62. Under normal operations, such contact would not cause a problem; however, if certain malfunctions were to occur, a problem could result, accordingly, the insulation may be provided to preclude such problems.

The above-described apparatus wherein the nozzle valve is released in response to movement of the pressure plate from a first position to a second position may be termed an "active" system wherein the pressure plate actively or positively deflects the latching apparatus, i.e., deflectable arm 86 to a position wherein it is no longer serving to restrain the nozzle valve 62.

Figure 5:
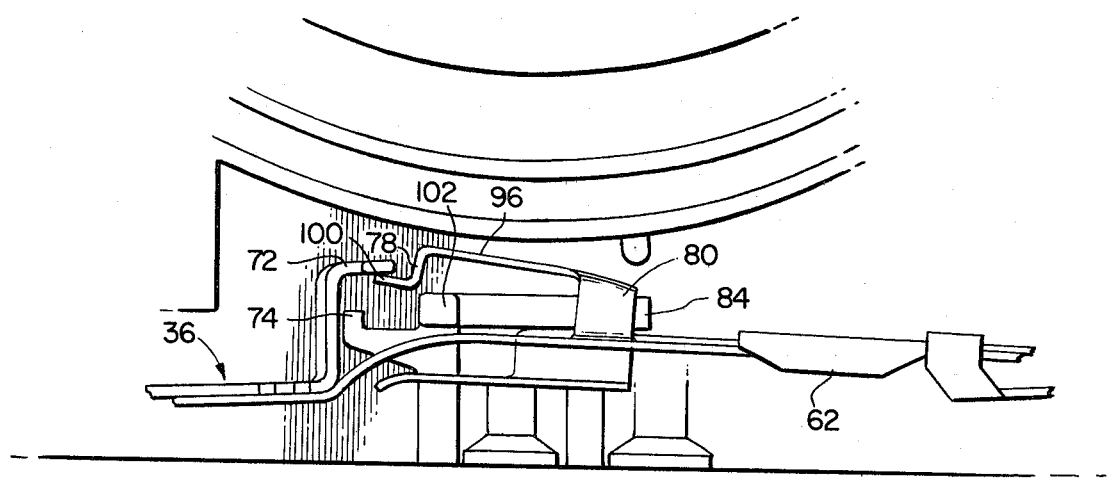
FIG. 5 is a view similar to FIG. 4 illustrating the pressure plate and slide valve following movement of the pressure plate to the position it is in during the processing cycle.

Referring now to FIGS. 4 and 5, another embodiment of the invention is illustrated. In this embodiment, a resilient deflectable arm 96 extends from the back side of the U-shaped member 82 of the nozzle valve 62. This resilient arm 96 terminates in a latching section which is defined by a first leg 98 which extends in a direction substantially normal to the direction of motion of the nozzle valve 62 when it is actuated to move into blocking engagement with the processor nozzle and a second leg 100 extending substantially perpendicular to the first leg 98 and adapted to be disposed between the pressure plate retaining section 72 and the cassette structure 74. The deflectable resilient arm 96 is held in the position illustrated in FIG. 4 by the pressure plate and the force exerted by the pressure plate leaf spring 80 when the pressure plate is not in operative engagement with the processing/viewing apparatus with which it is designed to cooperate. As in the previously described embodiment, in this position the slide valve 62 is positively prevented from inadvertent movement from its at rest position by virtue of contact of the latching leg 98 with a mating face 102 in the cassette structure. FIG. 5 illustrates the relevant positions of the pressure plate and the deflectable resilient arm 96 following placement of the cassette in operative relation with the viewer/processor during the processing cycle and before the nozzle valve 62 has been slidably displaced into blocking engagement with the processor nozzle. In this condition, the pressure plate 36 has been moved to the position wherein it will present minimal drag upon the film strip 26 during high speed continuous transport of the film. As is clearly seen in FIG. 5, movement of the pressure plate to this position results in movement of the deflected resilient arm 96 upwardly to its undeflected position wherein the latching leg 98 of the resilient arm 96 is no longer in engagement with the mating face 102 of the cassette and accordingly the slide valve 62 is free to move along with the film strip at the designated time into the desired blocking engagement with the nozzle opening 58. The above-described apparatus for pressure plate release of the nozzle valve is referred to as a "passive" system wherein the movement of the pressure plate from its at rest position to the position it is in when the viewer is in the processing mode merely permits movement of the normally deflected resilient arm 96 to its unlatched position as contrasted to the previously described "active" arrangement wherein the pressure plate itself actually engaged and caused the deflection of the member 86 to its unlatched position.

Figure 6:
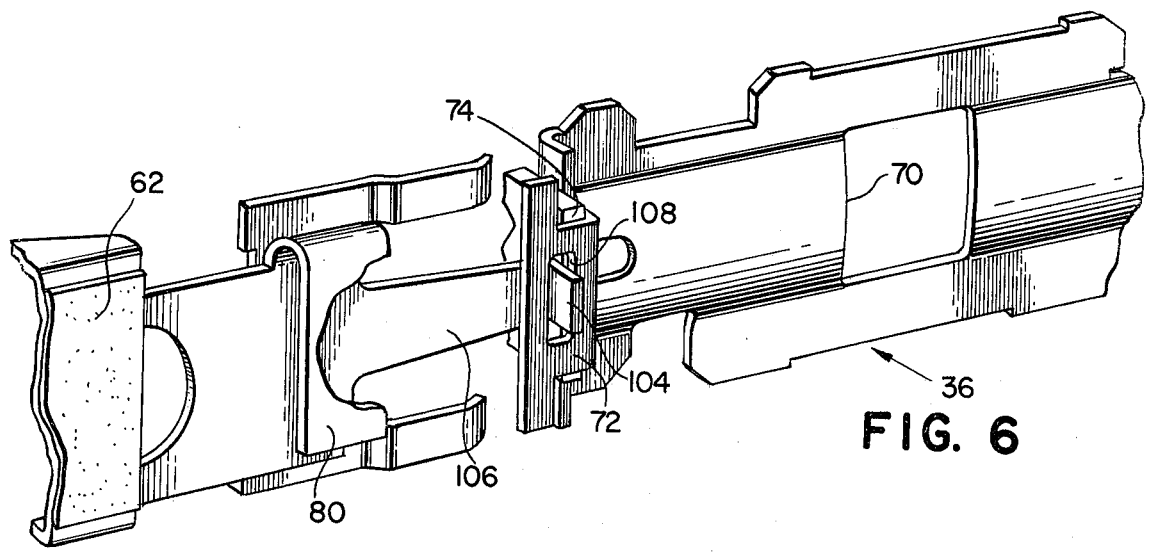
FIG. 6 is a perspective view illustrating the relative position of the pressure plate and slide valve in still another embodiment of the invention when the cassette is not in operable engagement with other apparatus.
Figure 7:
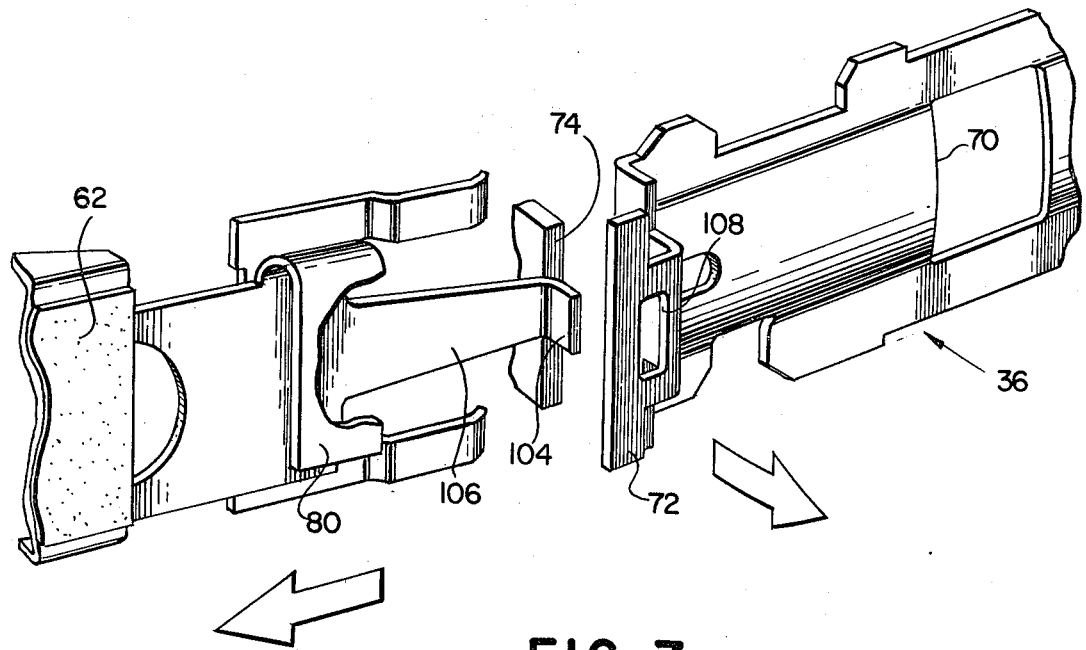
FIG. 7 is a view similar to FIG. 6 illustrating the pressure plate and slide valve following movement of the pressure plate to the position it is in during the processing cycle.

FIGS. 6 and 7 illustrate, in the latched and unlatched positions respectively, another "passive" arrangement for making use of the pressure plate to prevent inadvertent premature release of the nozzle valve 62. In this embodiment, the cassette structure 74 for retaining the pressure plate located nearest the slide valve is configured to permit a latching leg 104 which is formed at the end of a connection leg 106 extending from the front side of the U-shaped portion 82 of the nozzle valve to be positioned in overlapping relation with the front side of the pressure plate retaining section 72. The latching leg 104 is oriented in a direction substantially normal to the direction of travel of the slide valve 62 and is adapted to pass through an opening 108 formed in the end of the pressure plate retaining section 72. As in the above-described embodiments, it is evident referring to FIG. 6 that the pressure plate and latching leg 104 will serve to retain the slide valve 62 in its initial "stored" position when the pressure plate is in its normal position. Similarly, as illustrated in FIG. 7, when the pressure plate is moved to its second position upon operative engagement with processor/viewer apparatus and initiation of the processing cycle, the latching leg 104 will no longer be restrained and is free to move along with the slide valve in response to engagement by the advancing film strip to permit free movement of the valve to its final position blocking the nozzle opening 58 and displacing the pressure pad outwardly away from the film strip.

This invention may be practiced or embodied in still other ways without departing from the spirit or essential character thereof. The preferred embodiments described herein are therefore illustrative and not restricted, the scope of the invention being indicated by the appended claims and all variations which come within the meaning of the claims are intended to be embraced therein.

I claim:

1. A photographic film handling cassette for use with other apparatus for treating a strip of exposed photographic film material with processing fluid to develop viewable images on the film strip, said cassette comprising:

a housing for retaining the film strip, said housing including an opening for exposing progressive incremental sections of the film strip;

means responsive to drive means of said other apparatus for advancing the film in a given path within said housing, said given path traversing said opening;

a pressure plate located within said housing at said opening, said pressure plate being in a first position when said cassette is not in operable engagement with said other apparatus and being displaceable to a second position, in response to a force from said other apparatus;

film processing means for depositing a layer of processing fluid on the exposed film strip;

selectively operable means for disabling said film processing means following deposit of said fluid layer; and means normally operative for preventing the operation of said disabling means, said means for preventing being rendered inoperable to prevent the operation of said disabling means responsive to the displacement of said pressure plate from its said first position to its said second position.

2. The cassette of claim 1 wherein said processing means includes a nozzle opening configured for releasing fluid to the film strip, said means for disabling includes a valve member configured for movement between a first position adjacent said nozzle opening and a second position wherein said valve member is in blocking engagement with said nozzle opening, said means for preventing comprises a deflectable latching member forming a part of said valve member, said deflectable member being engaged by said pressure plate and held in a first position by said pressure plate when said pressure plate is in its first position, means for deflecting said deflectable latching member to a second position when said pressure plate is in its second position, and means operatively engaging said deflectable latching member only when it is in its said first position for preventing movement of said valve member from its said first position to its said second position, whereby movement of said pressure plate from its said first position to its said second position by said other apparatus results in deflection of said deflectable latching member to its said second position wherein it is not operatively engaged and said valve member is free to move to its said second position.

3. The cassette of claim 1 wherein said processing means includes a nozzle opening configured for releasing fluid to the film strip, said means for disabling includes a valve member configured for movement between a first position adjacent said nozzle opening and a second position wherein said valve member is in blocking engagement with said nozzle opening, said means for preventing comprises a deflectable resilient latching member forming a part of said valve member, said deflectable member being engaged by said pressure plate and held in a deflected position by said pressure plate when said pressure plate is in its said first position, and means operatively engaging said deflectable latching member only when it is in said deflected position for preventing movement of said valve member from its said first position to its said second position, whereby movement of said pressure plate from its said first position to its said second position by said other apparatus releases said resilient deflectable latching member to its said undeflected position wherein it is not operatively engaged and said valve member is then free to be moved to its said second position.

4. The apparatus of claim 1 wherein said processing means includes a nozzle opening configured for releasing fluid to the film strip, said means for disabling includes a valve member configured for movement between a first position adjacent said nozzle opening and a second position wherein said valve is in blocking engagement with said nozzle, said means for preventing comprises a latching member forming a part of said valve member, said latching member engaging said pressure plate only when said pressure plate is in its said first position, in a manner to prevent movement of said valve to its said second position.

5. The apparatus of claim 4 wherein said pressure plate includes an opening through which a portion of said latching member extends only when said pressure plate is in its said first position.

6. The apparatus of claim 2 wherein said pressure plate and said deflectable latching member are electrically insulated from one another.

7. The apparatus of claim 2 wherein said valve member is moved from its said first position to its said second position responsive to film advancement in a given direction.

8. The apparatus of claim 7 wherein said valve member is slidably mounted within said cassette for movement substantially parallel to said film strip's given path for movement from its said first position to its said second position, said valve member including means engageable by said film and said film including complementary structure for engaging said engageable means when said film is advanced thereby in a given direction to thereby displace said valve member to its said second position.

* * * * *